UNITED STATES PATENT OFFICE.

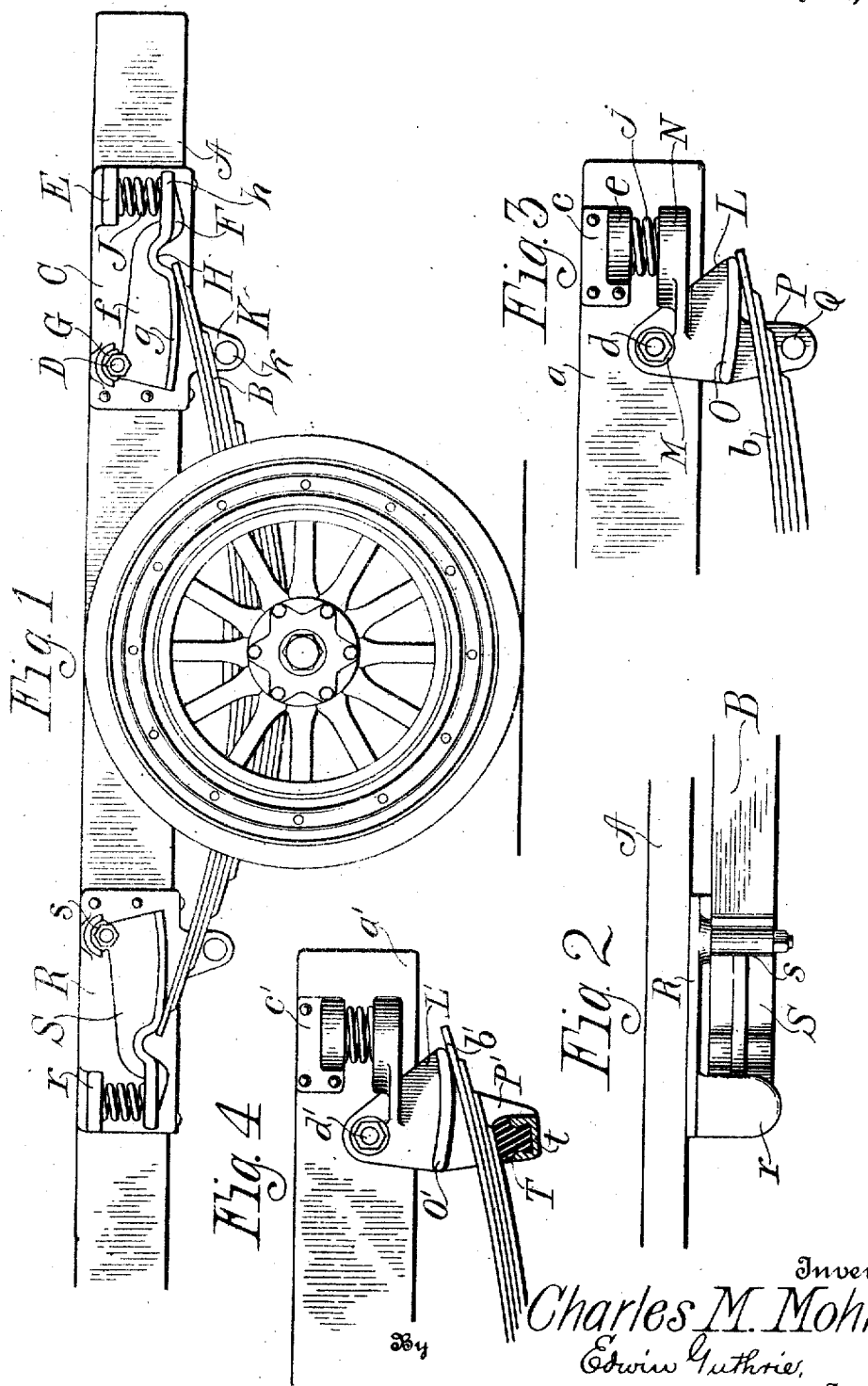

CHARLES M. MOHLER, OF RICHMOND, INDIANA.

SPRING SADDLE AND SHOCK-ABSORBER.

1,339,779.   Specification of Letters Patent.   Patented May 11, 1920.

Application filed August 7, 1919. Serial No. 315,946.

*To all whom it may concern:*

Be it known that I, CHARLES M. MOHLER, citizen of the United States, residing at Richmond, in the county of Wayne and State of Indiana, have invented certain new and useful Improvements in Spring Saddles and Shock-Absorbers, of which the following is a specification.

This invention relates to spring saddles and shock absorbers, and belongs with that class or type of spring devices which are designed for interposition between the ends of leaf springs of vehicles generally, and motor vehicles and trucks in particular, and the frames of such vehicles, to uphold the frames and to utilize the resilience of the springs to the fullest extent without injury to the springs themselves.

It is an object of this invention to produce a spring end engaging contrivance embodying a shock absorber spring fashioned and disposed to take up light shocks as the vehicle proceeds, the contrivance possessing additional means for compressing the leaf springs with a relatively rolling pressure or force thereon, as distinguished from a sliding, frictional and, therefore, wearing movement, resulting during the operation of a number of like contrivances with which this applicant is acquainted. The special construction and arrangement of the parts of this invention are also objects thereof.

In the accompanying drawings the various parts and their arrangement with regard to each other are illustrated, and Figure 1 represents the side view of a wheel of a truck and a portion of the side of the frame thereof, showing this invention applied thereto. Fig. 2 is a top plan view of this invention. Fig. 3 is a side view of part of the side of a truck frame, showing a modified form of this invention applied thereto. Fig. 4 is a side view of part of the side of a truck frame showing a modified form of this invention similar to that shown in Fig. 3, and including a cushion of rubber or the like to render the rebound movement noiseless.

Throughout the description and drawings the same letter is employed to refer to the same part.

Considering Figs. 1 and 2 of the drawings, the letter A designates one side of a truck frame, and B is a leaf spring. To the frame A is secured the base plate C, and projecting from the plate is a trunnion pin D. Near the upper right hand corner, the plate C is provided with a spring socket or seat E. The trunnion pin pivotally supports a rocking spring bearing referred to generally by the letter F. This member has the backbone or vertical flange $f$, a sleeve G engaging the trunnion pin, and a curved lower flange or bearing portion $g$. It will be noted that the curve of the portion $g$ is a curve of relatively long radius, and it is this portion which rocks in contact with the leaf spring, the point of contact moving in and out on the leaf spring as that spring bends under a load and recovers. It will be noted in Fig. 1 that the spring bearing F has a reëntrant portion or recess H adjacent to the end of the leaf spring B, affording room for the end-play of that spring. The free or movable end of the rocking spring bearing F has a spring seat $h$, and the shock absorber spring J engages the seats E and $h$. The plate C has the dependent lug or extension K, and from the extension K there projects the rebound stud $k$, that acts to limit the rebound of the frame with respect to the leaf spring.

In the modification illustrated in Fig. 3, the side $a$ of the truck frame has a relatively smaller plate $c$ secured thereto, and a trunnion pin $d$ projects from the frame directly. The plate $c$ has the spring socket or seat $e$. In this modification the rocking spring bearing L has a sleeve M by which the bearing is pivotally supported upon the pin $d$, and it has a horizontally projecting spring seat N, and a curved bearing flange O. This modification also has a depending lug P, and a rebound stud Q, for limiting the rebound movement of the frame with respect to the leaf spring.

In the construction shown in Fig. 4, the parts are mostly of the same form as illustrated in Fig. 3. There is the side $a'$ of the frame, the plate $c'$, the trunnion pin $d'$, the rocking spring bearing L′, having the curving flange O′, against which the end of the leaf spring $b'$ bears as explained, and the depending lug or extension P′. Instead, however, of a rebound pin projecting from the lug as previously described, there is provided a rubber cushion T, seated in a cupped container $t$. While this invention is especially applicable to trucks supposed to carry heavy loads, and expected to endure hard service, it is believed it could be applied with advantage to pleasure cars, and it is desirable that there shall be no noise made on the rebound. When rebound pins are used there is a slight rap noticed, but by employing the rubber cushion T, or the like, the effect of the contact with the spring on the rebound is not audible.

In the practice of this invention, it will be understood that each end of the leaf spring is provided with a rocking bearing. The two devices illustrated in Fig. 1 are of the same structure, but obviously made for the right and left hand ends of the spring B. The second plate R, in Fig. 1, has a spring seat r, and the rocking spring bearing or saddle S has the sleeve s by which it is pivotally supported on the plate. The same parts in size, number and construction are provided at the left hand end of the leaf spring, as have been described as located at the right hand end of the spring B. Their operation and the operation of the modified form set forth in Fig. 3 is the same. The shock absorber springs J and j assist only in relieving the entire chassis assembly of the smallest shock vibrations, and they are completely compressed before more than a slight compression of the main leaf spring B occurs. When the leaf spring is acted upon by the load vibrations, the curved bearing surfaces of the rocking spring bearings or saddles exert a relatively rolling motion or effect under which the end of the leaf spring flattens out correspondingly. As the main spring is deflected, the point of load travels from the outer end of the spring toward the middle. In actual practice, this distance is about eight inches. This feature makes it almost impossible to overload the main spring under ordinary conditions. It is believed that by thus subjecting the spring to a variable point of loading, the whole resilient value of the spring is utilized without excessive shock or jar, and without injury to the spring.

Having now described this invention, and explained the mode of its operation, what I claim is:—

1. In a spring saddle and shock-absorber, the combination with a frame, of a leaf spring, a rocking spring bearing having a lower curved surface of relatively long radius resting upon the leaf spring, one end of the said rocking bearing being pivotally connected with the said frame, and a shock absorber spring arranged between the other end of said rocking bearing and said frame whereby said curved surface rocks upon the leaf spring and the point of contact moves in and out upon said spring under variations of load.

2. In a spring saddle and shock absorber, the combination with a frame, of a trunnion pin connected with the frame, a rocking spring bearing having one end pivotally supported by said pin, the said bearing having a curved lower surface, a shock absorber spring, means for connecting said spring with the frame and with the free end of the rocking spring bearing, a leaf spring in contact with the said curved surface of the spring bearing, and means for limiting the rebound movement of the frame with respect to the leaf spring.

3. In a spring saddle and shock absorber, the combination with a frame, of a leaf spring, a rocking spring bearing having a lower curved surface of relatively long radius resting upon the leaf spring, one end of the said rocking bearing being pivotally connected with the said frame, a shock absorber spring arranged between the other end of said rocking bearing and said frame, whereby the said curved surface rocks upon the leaf spring and the point of contact moves in and out upon the said spring under variations of load, and means for limiting the rebound movement of the leaf spring.

4. In a spring saddle and shock absorber, the combination with a frame, of a base plate secured to the frame, a trunnion pin projecting from the base plate, a rocking spring bearing having one end pivotally supported by the said pin, the said bearing having a curved lower surface, a shock absorber spring, means for connecting the said spring with the said base plate and with the spring bearing, a leaf spring in contact with the curved surface of the said rocking spring bearing, and means for limiting the rebound movement of the frame with respect to the leaf spring.

5. In a spring saddle and shock absorber, the combination with the frame, of a trunnion pin connected with the frame, a rocking spring bearing having one end pivotally supported by said pin, a shock absorber spring, means for connecting the said spring with the frame and with said spring bearing, a leaf spring in contact with the said spring bearing, the said spring bearing having a reëntrant portion or recess adjacent to the end of said leaf spring, and means for limiting the rebound movement of the frame with respect to the said leaf spring.

In testimony whereof I affix my signature.

CHARLES M. MOHLER.